United States Patent [19]

Flory et al.

[11] 4,387,569
[45] Jun. 14, 1983

[54] HYDRAULIC BRAKE BOOSTER

[75] Inventors: Donald M. Flory, Arcanum; Denny L. Peeples, Dayton, both of Ohio

[73] Assignee: General Motors Corporation, Detroit, Mich.

[21] Appl. No.: 204,464

[22] Filed: Nov. 6, 1980

[51] Int. Cl.³ .............................................. B60T 13/12
[52] U.S. Cl. .................................... 60/548; 60/547.3; 91/384; 91/391 R; 91/434
[58] Field of Search ............... 60/550, 551, 547 A, 60/547 B, 548; 91/391 R, 372, 373, 434, 377, 384

[56] References Cited

U.S. PATENT DOCUMENTS

| | | | |
|---|---|---|---|
| 3,603,209 | 9/1971 | MacDuff | 91/391 R |
| 3,625,005 | 12/1971 | Saunders | 60/550 |
| 3,638,427 | 2/1972 | Meyers | 60/550 |
| 3,664,130 | 5/1972 | Meyers | 60/550 |
| 3,831,494 | 8/1974 | Carre | 91/391 R |
| 3,877,227 | 4/1975 | Demido | 60/547 B |
| 3,915,066 | 10/1975 | Thomas | 91/391 R |
| 3,995,529 | 12/1976 | Bach | 60/547 A |
| 4,050,251 | 9/1977 | Carre | 60/550 |
| 4,296,674 | 10/1981 | Monroe | 60/547 B |

FOREIGN PATENT DOCUMENTS

1438930  6/1976  United Kingdom ............ 91/391 R

*Primary Examiner*—Abraham Hershkovitz
*Attorney, Agent, or Firm*—D. D. McGraw

[57] ABSTRACT

A hydraulic brake booster which has an input valve control member acting through a controlled rate spring and through a lever pivoted on the booster housing in the power chamber to move a spool valve in a bore parallel to the power piston so that the input is strictly through the spring. The lever has no connection to the power piston. The control valve is hydraulically unbalanced to a release position and is also urged to the release position by a valve spring. This maintains a proportion between the input force due to the reaction spring, through which input force is applied, and booster pressure. Upon power runout or failure the input and reaction piston overtravels and contacts the output rod to move that rod without moving the power piston.

3 Claims, 3 Drawing Figures

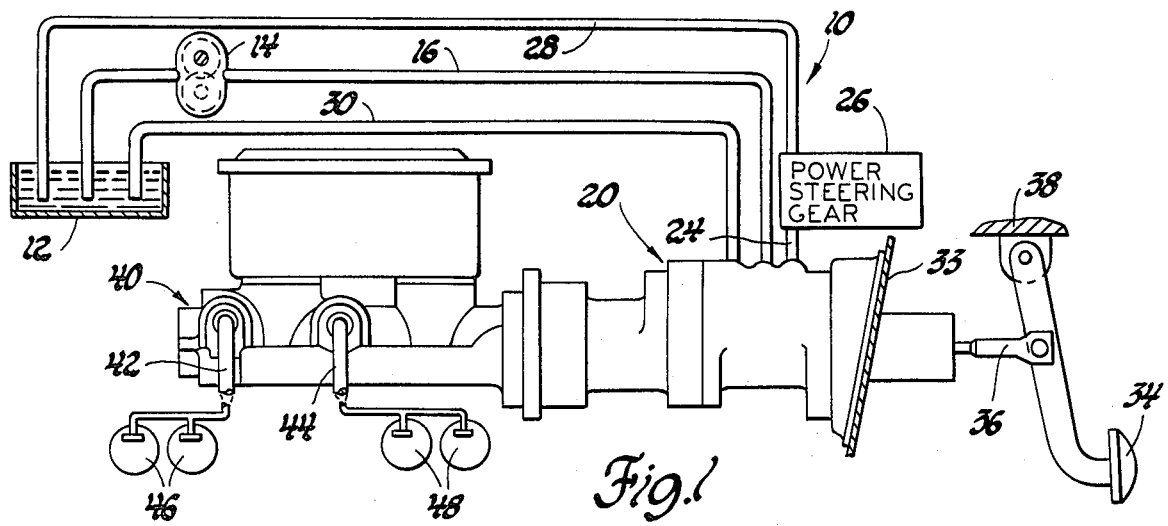
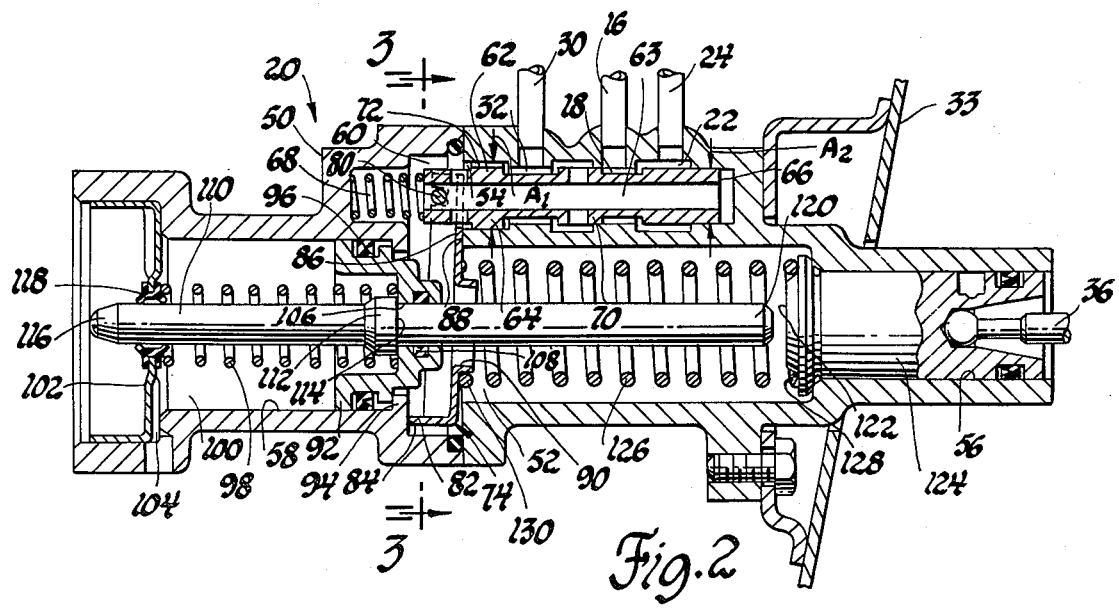
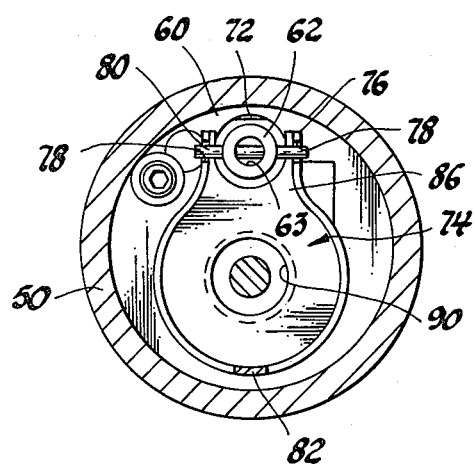

HYDRAULIC BRAKE BOOSTER

The invention relates to a hydraulic brake booster which is spring modulated. The booster control valve is controlled by exerting an input force through a reaction spring to a control lever arranged to pivot on a fixed point on the booster housing and to move the control valve in accordance with pivotal movement of the lever. A reaction piston through which input force is provided to the reaction spring is subjected to booster power pressure to provide reaction to the brake operator. In the event of power failure, the reaction piston can overtravel by sufficient compression of the reaction spring and can directly contact an output rod normally acted upon by the booster power piston during power operation. The output rod can then be moved to actuate the master cylinder manually without requiring movement of the power piston or compression of the power piston return spring.

Earlier hydraulic brake boosters utilizing a reaction lever to control the booster control valve located in a separate bore from the power piston are exemplified by U.S. Pat. Nos. 3,610,102—Brown, Jr.; 4,050,251—Carre et al.; and 4,117,766—Kervagoret. These patents are similar in that the reaction lever pivots either on the power piston as in the Brown, Jr. disclosure or on a connecting lever between the valve and the power piston as illustrated in the other references. The Carre et al. and Kervagoret references have a direct mechanical apply to the lever arrangement rather than through a reaction spring. None of these references have the mechanical apply arrangement wherein the input and reaction piston overtravels and contacts the output rod to move that rod without moving the power piston. There are numerous other patents similar to the Brown, Jr. disclosure and assigned to the same assignee which show arrangements like that of the Brown, Jr. disclosure.

IN THE DRAWING:

FIG. 1 is a schematic representation of a hydraulic brake booster system including a booster embodying the invention.

FIG. 2 is a cross section view with parts broken away of the brake booster embodying the invention and showing the booster in the released position.

FIG. 3 is a cross section view taken in the direction of arrows 3—3 of FIG. 2.

The system 10 illustrated in FIG. 1 includes a hydraulic fluid reservoir 12 and a hydraulic pump 14 which takes hydraulic fluid from reservoir 12 and transmits it through a conduit 16 to the inlet 18 of the hydraulic brake booster 20. The outlet 22 of the hydraulic brake booster 20 is connected to conduit 24 which leads to the vehicle power steering gear 26. Conduit 28 conducts hydraulic fluid back to the fluid reservoir 12. A conduit 30 is connected to a port 32 of booster 20 to return hydraulic fluid from the booster directly to the reservoir 12 under certain conditions of operation. The booster 20 is suitably mounted to a fixed portion 33 of the vehicle in which the system is installed and is actuated by movement of a brake pedal 34 connected to the booster by the input push rod 36. Brake pedal 34 is illustrated as being pivotally mounted to another portion 38 of the vehicle. The booster 20 is connected and arranged to operate the master cylinder 40 which pressurizes brake fluid in the brake lines 42 and 44 to actuate the brake sets 46 and 48 on the vehicle. The brake set 46 may, for example, be the vehicle front brakes and the brake set 48 may be the vehicle rear brakes.

The booster 20 is more particularly illustrated in FIGS. 2 and 3. It has a housing 50 which defines a hydraulic pressure power chamber 52, a control valve chamber 54, an inlet bore 56 and a power piston bore 58. Inlet 18, outlet 22 and port 32 are formed in the housing 50 so as to appropriately open into the control valve chamber 54. The portion 60 of control valve chamber 54 is in continuous fluid communication with the power chamber 52. A control valve 62 is mounted in control valve chamber 54 for reciprocal movement to control the hydraulic booster. A bore 63 extends axially through the valve. The valve has a land 64, having a valve area $A_1$, located adjacent the end of the valve extending into portion 60 of the valve chamber. The other end of the valve has a land 66 having an area $A_2$ which is smaller than $A_1$ so that the valve is provided with a differential area hydraulically unbalancing the valve to the line as seen in FIG. 2, which is toward the booster release position of control. A compression valve spring 68 is provided in valve chamber portion 60 and acts on the control valve 62 to continuously urge the control valve rightwardly toward the booster release position of control. The valve 62 has a center land 70 axially spaced from lands 64 and 66. The lands are arranged to cooperate with the inlet 18, outlet 22 and port 32 to provide for control of the brake booster. A groove 72 is provided in the outer periphery of land 64 to provide a small controlled leak between port 32 and portion 60 of the control valve chamber.

A control lever 74 is positioned within power chamber 52 so that one end 76 extends to valve 62. The lever end 76 is illustrated as being bifurcated and having notches 78 which fit over a pin 80 extending through and secured to the end of valve 62 which extends into chamber portion 60. Lever 74 extends downwardly into the power chamber 52 so that its other end 82 extends radially beyond the diameter of the power piston bore 58. Lever end 82 constitutes a pivot which is engageable with the fixed pivot point 84 formed on a portion of the booster housing 50 within power chamber 52. An intermediate portion 86 of lever 74 engages a shoulder 88 formed by a portion of the housing 50 between the power chamber 52 and the control valve chamber 54. The lever 74 is constructed with an opening 90 arranged to be coincident with the common axis of the inlet bore 56, power chamber 52 and power pivot bore 58.

The power piston 92 is reciprocably received in power piston bore 58 and in the release position engages a shoulder 94 of a housing 50. It is provided with a suitable seal 96 which operates between the piston 92 and the wall of piston bore 58 in a sealing manner as is well known in the art. A power piston return spring 98 is provided in a chamber 100, which is on the opposite side of piston 92 from power chamber 52 and formed by a portion of the power piston bore 58. An end wall 102 closes chamber 100 at its outer end and a suitable vent 104 is provided to maintain chamber 100 at atmospheric pressure. An aperture 106 is axially formed through piston 92 and a suitable seal 108 is provided within the aperture.

The output rod 110 extends through the piston aperture 106 in sealing relation and is axially movable relative to the piston. A land 112 provided in the center portion of rod 110 has one side forming a shoulder 114 which normally engages the piston side wall facing chamber 100. The end 116 of rod 110 extending through chamber 100 passes through a seal 118 provided in end wall 102 and engages a suitable portion of the master cylinder 40 so that leftward movement of the output rod, as seen in FIG. 2, will actuate the master cylinder. The other end 120 of rod 110 extends rightwardly through the major portion of power chamber 52. It terminates in what is normally axially spaced relationship with the end 122 of the input and reaction piston 124.

Piston 124 is reciprocally mounted in input bore 56. The piston end 122 includes a flange somewhat larger in diameter than bore 56 and located in power chamber 52. Engagement of the flange with a shoulder of the housing 50 at the inner end of bore 56 defines the release position of piston 124, this position being illustrated in FIG. 2. A reaction spring 126 of the coil compression type is located in chamber 52 about output rod end 88. One spring end 128 is seated on piston end 122 and the other spring end 130 is seated on control lever 74 circumferentially outward of opening 90 in the lever. The characteristics of springs 68 and 126 and the effective lever arms of lever 74 are such that, in the release position of the booster, spring 68 urges valve 62 rightwardly in chamber 54 until the intermediate portion 86 of lever 74 engages shoulder 88 and the lever end 82 engages the fixed pivot point 84. Spring 126 holds piston 124 in the release position. The input push rod 36 is suitably connected to piston 124 so that brake actuating movement of brake pedal 34 and push rod 36 causes piston 124 to move within bore 56 toward and into power chamber 52. This force is transmitted through spring 126 to lever 74 and is sufficient to pivot the lever about pivot point 84, causing valve 62 to move leftwardly against the force of valve spring 68. This action will restrict fluid flow between inlet 18 and outlet 22 and open fluid flow from inlet 28 through bore 63 into the power chamber 52. Thus hydraulic pressure builds up in the power chamber 52 and this pressure acts on power piston 92 to move the power piston in the brake actuating direction. The power piston force so developed acts to compress return spring 98 and also acts through shoulder 114 to move the output rod 110 to actuate the master cylinder. The hydraulic pressure in chamber 52 acts against the unbalanced area of control valve 62, tending to move that valve rightwardly. The pressure also acts against the area of input and reaction piston end 122 to transmit a suitable reaction force to the operator through the brake pedal 34. The rates of springs 68 and 126 can be chosen to give the desired operational characteristics of the booster.

In the event of hydraulic power failure or insufficiency, piston 124 will be manually moved sufficiently relative to rod 120 to engage that rod end. Manual force output directly to the master cylinder through rod 110 is then available. Due to the sliding arrangement of rod 110 relative to power piston 92, the output rod is applied without moving the power piston 92 or compressing the piston return spring 98. This therefore provides for manual brake actuation without having to overcome forces which do not contribute to such actuation under manual conditions.

The embodiments of the invention in which an exclusive property or privilege is claimed are defined as follows:

1. In a hydraulic booster having a housing, an input and reaction piston and a power piston forming portions of walls of a power chamber formed in the housing, a control valve in a control valve chamber formed in the housing, the control valve being hydraulically unbalanced toward the booster release position of control and also being continuously urged toward the booster release position of control by a valve spring, a power piston return spring continuously urging the power piston toward the input and reaction piston, and a control lever operatively engaging the control valve and the input and reaction piston, said improvement comprising:

said control lever having one end in the power chamber and the other end pivotally connected to the control valve and an intermediate portion which when the booster is released engages a shoulder formed on the booster housing between the power chamber and the valve chamber, said control lever one end forming a pivot engaged in pivotal relation with a fixed pivot point on the housing, and a reaction compression spring in the power chamber having one end acting directly on said control lever intermediate said lever ends and the other end acting on said input and reaction piston so that booster actuating movement of the input and reaction piston toward the power piston transmits force through said reaction spring assuring engagement of said control lever one end pivot with said fixed pivot point and thereafter causes pivoting movement of the control lever about said fixed pivot point to move said control lever other end and said control valve in a booster actuating direction to permit hydraulic pressure to pressurize the power chamber, the pressure fluid in the power chamber acting to move the power piston and also acting on the input and reaction piston to provide feedback.

2. In a hydraulic booster for operating a master cylinder and having a housing, a manually operable input and reaction piston and a power piston forming portions of walls of a power chamber formed in the housing, a power piston output rod, a control valve in a control valve chamber formed in the housing, the control valve being hydraulically unbalanced toward the booster release position of control and also being continuously urged toward the booster release position of control by a valve spring, a power piston return spring continuously urging the power piston toward the input and reaction piston, and a control lever operatively engaging the housing and the control valve and the input and reaction piston, said improvement comprising:

said control lever having one end in the power chamber and the other end pivotally connected to the control valve and an intermediate portion which when the booster is released engages a shoulder formed on the booster housing between the power chamber and the valve chamber so as to define the precise released position of the control valve when the booster is released, said control lever one end forming a pivot engaged in pivotal relation with a fixed pivot point on the housing, and a reaction compression spring in the power chamber having one end acting directly on said control lever intermediate said lever ends and the other end acting on said input and reaction piston so that booster actuating movement of the input and reaction piston toward the power piston transmits force through said reaction spring assuring engagement of said control lever one end pivot with said fixed pivot point and thereafter causes pivoting movement of the control lever about said fixed pivot point to move said control lever other end and said control valve in a booster actuating direction to permit hydraulic pressure to pressurize the power chamber, the pressure fluid in the power chamber acting to move the power piston and also acting on the input and reaction piston to provide feedback;

said piston output rod extending through said power piston in sealed slidable relation and having a shoulder normally engaging said power piston so that said output rod is moved by and with said power piston under hydraulic power operation, said piston output rod having an end extending into said power chamber and normally axially spaced from said input and reaction piston during booster power actuation and release, said input and reaction piston being movable to engage said piston output rod when insufficient hydraulic power pressure is available, establishing a manual force transmitting mechanical drive path from said input and reaction piston through said piston output rod to the master cylinder without causing manual force movement of said power piston and compression of said power piston return spring.

3. A hydraulic booster comprising: a housing having formed therein a hydraulic pressure power chamber;

a control valve chamber having a portion in continuous fluid communication with said power chamber;

a hydraulic fluid inlet opening into said control valve chamber for receiving hydraulic pressure fluid from a pressure source;

a hydraulic fluid outlet opening into said control valve chamber for operatively returning hydraulic pressure fluid to the pressure source;

a port for communication with a hydraulic fluid reservoir and opening into said control valve chamber, and an inlet bore and a power piston bore opening into said power chamber, a control valve movably received in said control valve chamber and having a differential area hydraulically unbalancing force urging said control valve toward the booster release position of control;

a compression valve spring in said control valve chamber portion in continuous fluid communication with said power chamber and acting on said control valve to continuously urge said control valve toward the booster release position of control;

a reaction piston having an input push rod adapted for booster controlling movement, said reaction piston being reciprocably received in said inlet bore and having one end continuously exposed to the pressure of fluid in said power chamber;

a power piston reciprocably received in said power piston bore and having one end continuously exposed to the pressure of fluid in said power chamber;

a piston return spring acting on said power piston and continuously urging said power piston toward said reaction piston;

an output rod mounted axially to said power piston and extending outwardly of said power piston bore for actuating a master cylinder;

a control lever having one end in said power chamber and the other end in said control valve chamber and having an intermediate portion which when said booster is released engages a portion of said housing between said chambers forming a shoulder, said control lever one end forming a pivot point engaged in pivotal relation with a fixed pivot point on said housing formed by another shoulder in said power chamber located adjacent said power piston bore, said control lever other end being pivotally received on said control valve;

and a reaction compression spring in said power chamber having one end acting on said control lever intermediate said lever ends and the other end reacting on said reaction piston;

booster actuating movement of said input push rod and said reaction piston toward said power piston transmitting force through said reaction spring to pivotally move said control lever one end at said fixed pivot point and cause pivoting movement of said control lever about said fixed pivot point to move said control lever other end and said control valve against the force of said valve spring and the differential area hydraulically unbalancing force to move said control valve to permit hydraulic pressure fluid from said inlet to pressurize said power chamber and act to move said power piston and said output rod to actuate a master cylinder, the pressure fluid in said power chamber also acting on said reaction piston and providing feedback.

* * * * *